(No Model.)
E. C. BÄSE.
RIM FOR SPECTACLES OR EYEGLASSES.
No. 451,016. Patented Apr. 28, 1891.
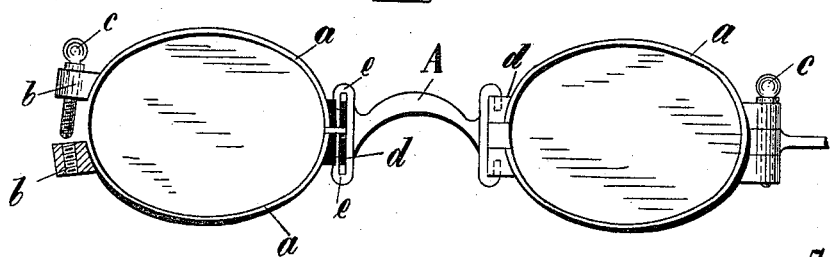
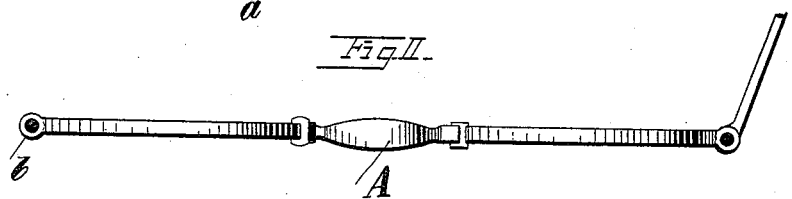
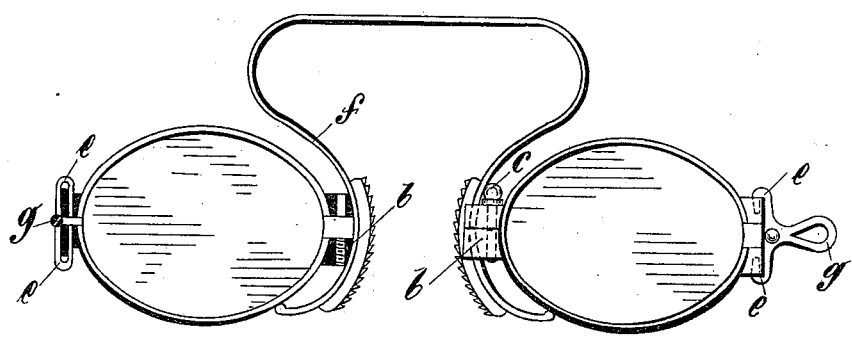
Witnesses:
James Haw.
M. Bosch.
Inventor
Edward Carl Bäse
by
Park Benjamin
his Attorney

United States Patent Office.

EDUARD CARL BÄSE, OF BURG, NEAR MAGDEBURG, GERMANY.

RIM FOR SPECTACLES OR EYEGLASSES.

SPECIFICATION forming part of Letters Patent No. 451,016, dated April 28, 1891.

Application filed December 16, 1890. Serial No. 374,887. (No model.)

*To all whom it may concern:*

Be it known that I, EDUARD CARL BÄSE, jeweler, of Burg, near Magdeburg, in the Kingdom of Prussia and German Empire, have invented new and useful Improvements in the Fastening of the Glasses in Spectacles or Eyeglasses, of which the following is a specification, reference being had therein to the accompanying drawings.

The object of my invention is to provide a ready method of securing the glasses or lenses of spectacles and like appliances within their rims, and in such a manner that a person unskilled in the trade may take out a broken or unsuitable glass and substitute another.

In the accompanying drawings, Figure I represents a pair of spectacles, and Fig. III an eyeglass embodying my invention and shown in partial section. Figs. II and IV represent edge views, respectively, of the said spectacles and eyeglass.

Similar letters of reference indicate like parts.

Referring first to Figs. I and II, A represents the bridge, upon the ends of which is secured a bowed or hooked piece $e$ of elastic metal or material having bent or hooked ends.

In place of the ordinary rims in which the glass is fixed, which are usually continuous or in one piece, I substitute two bowed arms or semi-rims $a\,a$. One extremity of each of these is furnished with a hollowed block $d$ and the opposite extremity with a threaded nut $b$.

It will be seen that when the blocks $d\,d$ are passed over the hooks $e$ and the glass inserted within the arms of semi-rims, which are worked or chiseled (preferably obliquely) to receive it, the nuts $b$ may be drawn together and the screw-pin $c$ inserted, so securing the glass, and that the more the pin $c$ is screwed home the nearer the blocks $d$ will be drawn over the hooks $e\,e$ and the more firmly will the glass be held.

Figs. III and IV show an application of my invention to the "pince nez," or folding eyeglasses, and in which the threaded nuts $b$ are so formed as to encompass and slide on the spring-connected arms $f$. The blocks $d\,d$ are attached to the outer extremities of the rims or arms $a\,a$ and by means of the hooks $e\,e$ in the above-described manner to a loop $g$, through which a cord or chain may be passed for the convenience of the wearer.

What I claim, and desire to secure by Letters Patent of the United States, is—

1. The combination, in spectacles or eyeglasses, of semi-rims or frames $a\,a$ for holding the glasses, each pair of semi-rims being secured at their extremities to a support and provided at their opposite extremities with means for drawing them into close proximity and so securing the glass within them.

2. The combination, in spectacles or eyeglasses, of semi-rims or frames $a\,a$, each pair of said semi-rims being jointed or hinged together at their extremities and provided at their opposite extremities with a screw and nut for drawing them into close proximity and so securing the glass within them.

3. The combination, in spectacles or eyeglasses, of a bridge or nose-piece and semi-rims or frames $a\,a$ for holding the glasses secured to said bridge and provided with means for drawing each pair of semi-rims into close proximity and so securing the glasses within them.

4. The combination, in spectacles or eyeglasses, of a bridge or nose-piece and semi-rims or frames for holding the glasses jointed at their respective extremities to the ends of said bridge, and provided at their opposite extremities with means for drawing them into close proximity and so securing the glasses within them.

5. The combination, in spectacles or eyeglasses, of the semi-rims $a\,a$, each semi-rim having at its extremities a hollow block $d$ and a threaded nut $b$, a support receiving said blocks $d$, and a screw-pin $c$ entering the nuts $b$, substantially as described.

6. The combination, in spectacles or eyeglasses, of the bridge-piece A, having the hooks $e$, the semi-rims $a\,a$, having a hollow block $d$, received upon said hooks $e$ and provided with the threaded nuts $b$, and screw-pin $c$, received in said nuts.

7. The combination, in spectacles, of the semi-rims $a\ a$, having at their extremities the threaded nuts $b$ and the hollow blocks $d$, the screw-pin $c$, received in said nuts $b$, and the loop $g$, having the hooks $e$ entering the blocks $d$.

Berlin, September 29, 1890.

EDUARD CARL BÄSE.

Witnesses:
W. BINCLEWALD,
W. SCHWICTHAL.